UNITED STATES PATENT OFFICE.

SAMUEL PEACOCK, OF CHICAGO, ILLINOIS, ASSIGNOR TO AMERICAN CYANAMID COMPANY, OF BALTIMORE, MARYLAND, A CORPORATION OF MAINE.

PROCESS OF MAKING STABLE CYANAMID FERTILIZERS.

968,399.  Specification of Letters Patent.  Patented Aug. 23, 1910.

No Drawing.  Application filed February 21, 1910. Serial No. 545,160.

*To all whom it may concern:*

Be it known that I, SAMUEL PEACOCK, a citizen of the United States, residing at Chicago, in the county of Cook and State of Illinois, have invented certain new and useful Improvements in Processes of Making Stable Cyanamid Fertilizers; and I do hereby declare the following to be a full, clear, and exact description of the invention, such as will enable others skilled in the art to which it appertains to make and use the same.

This invention relates to a process of slaking the caustic lime in calcium cyanamid, and has for its object to produce a fertilizer of this nature containing substantially no caustic lime, and without any substantial loss of nitrogen.

To these ends the invention consists in the novel steps constituting my process more fully hereinafter described and particularly pointed out in the claims.

Calcium cyanamid as manufactured contains from 15 to 25 per cent. caustic lime (CaO); and this lime must be hydrated before packing into sacks for market, for if it is not hydrated, it will gradually absorb water and increase not only in weight, but also in volume. Such increase not only destroys the containers used (usually burlap sacks) but also by increasing in weight it lessens the proportion of nitrogen to the total weight, thus causing commercial annoyances of various kinds, as well as more or less commercial disadvantages. The simple remedy for this problem is to hydrate the caustic lime by adding water during the process of manufacture. To do this, however, as a manufacturing process, it involves the direct use of sufficient water to hydrate the caustic lime; and to effect such hydration in a period of time sufficiently short to produce an economical manufacturing process, there arises an insuperable difficulty which is wholly confined to the very high heat of hydration of caustic lime. In other words, the heat generated by the reaction is found to be sufficient to raise the cyanamid being treated to a temperature considerably above the boiling point of water, and at such temperature not only is some of the cyanamid nitrogen actually driven off and lost, but its form is materially changed; and these latter conditions that arise are also very undesirable to the manufacture of various forms of fertilizer compounds in which cyanamid must be used.

Therefore, in carrying out my process, in order to thoroughly hydrate the caustic lime carried by the cyanamid in a comparatively short period of time, and at the same time to avoid the high temperature which must accompany this hydration when water is used, I employ the following procedure: I mix the raw cyanamid in a finely pulverized condition, with from about 30 to 50 per cent. of its weight of ground nitrate of soda. After thoroughly mixing these two substances together, water is gradually added to the mixture in sufficient total quantity to hydrate substantially all the caustic lime of the cyanamid. The partial hydration of the lime and the partial solution of the sodium nitrate proceed simultaneously. But the solution of nitrate of soda in water is accompanied by a well known cooling effect, and therefore I properly proportion the nitrate of soda to the cyanamid, so that the heat of hydration of the caustic lime of the cyanamid is sufficiently taken up by the heat absorption of the nitrate of soda solution to prevent the temperature arising sufficiently high to cause loss of cyanamid nitrogen or other detrimental results. In practice I do not find that any substantial loss of nitrogen occurs below 75 degrees centigrade. It follows that by this treatment I am enabled to hydrate the caustic lime of the cyanamid in a minimum of time without attaining such temperatures as are injurious to or inimical to the cyanamid, or to the materials combined with the cyanamid in making commercial fertilizers and other products.

It is obvious that any other heat absorbing or cooling solution that will not be injurious to the fertilizer or other products may be employed; although I prefer sodium nitrate on account of its fertilizer value and also on account of its cheapness, and it is also evident that the heat absorbing compound may be added to the cyanamid either during the process of manufacture of the cyanamid, or at any other time, and therefore I do not wish to be limited to the above details of procedure except as may be required by the claims.

In my copending application No. 545,159 of even date herewith for fertilizers, I have claimed the article produced by this process and therefore make no claim thereto *per se* herein.

What I claim is:—

1. The process of slaking the lime carried by fertilizers, which consists in mixing with said fertilizers a compound which upon solution in water absorbs heat and then adding water to the mixture in an amount sufficient to slake the lime, substantially as described.

2. The process of slaking the lime carried by calcium cyanamid, which consists in mixing with said cyanamid a sufficient quantity of a nitrogen compound which upon solution in water will absorb heat in order to prevent the temperature of the cyanamid rising to an injurious extent when water is later added thereto; and in adding sufficient water to said mixture to slake the said lime, substantially as described.

3. The process of slaking the free lime carried by calcium cyanamid, which consists in mixing with the same sufficient sodium nitrate to prevent any substantial loss of nitrogen when said lime is slaked, and in adding sufficient water to slake said lime, substantially as described.

In testimony whereof, I affix my signature, in presence of two witnesses.

SAMUEL PEACOCK.

Witnesses:
 WEAVER HARRIS,
 STANLEY HANNA.